(No Model.) 2 Sheets—Sheet 1.
C. G. BILLINGS.
STUMP OR GRUB EXTRACTOR.
No. 583,450. Patented June 1, 1897.
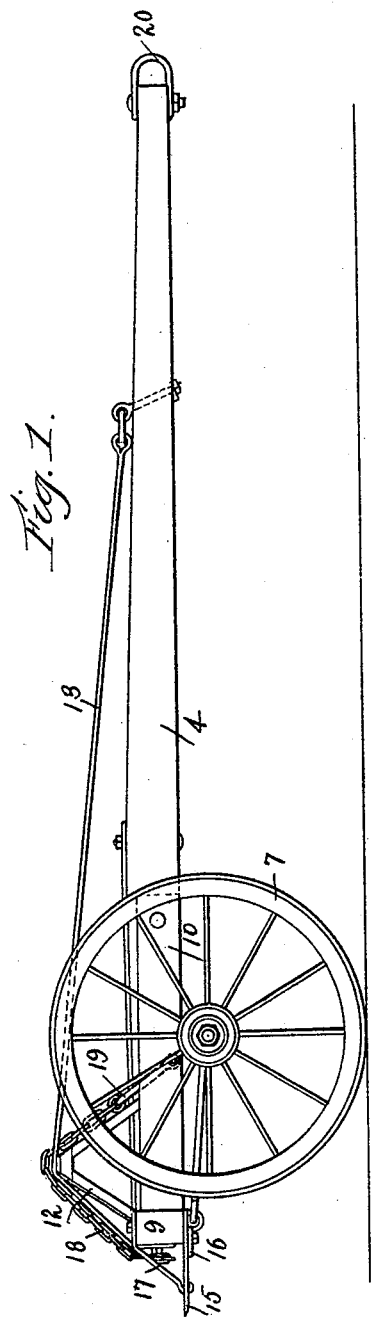
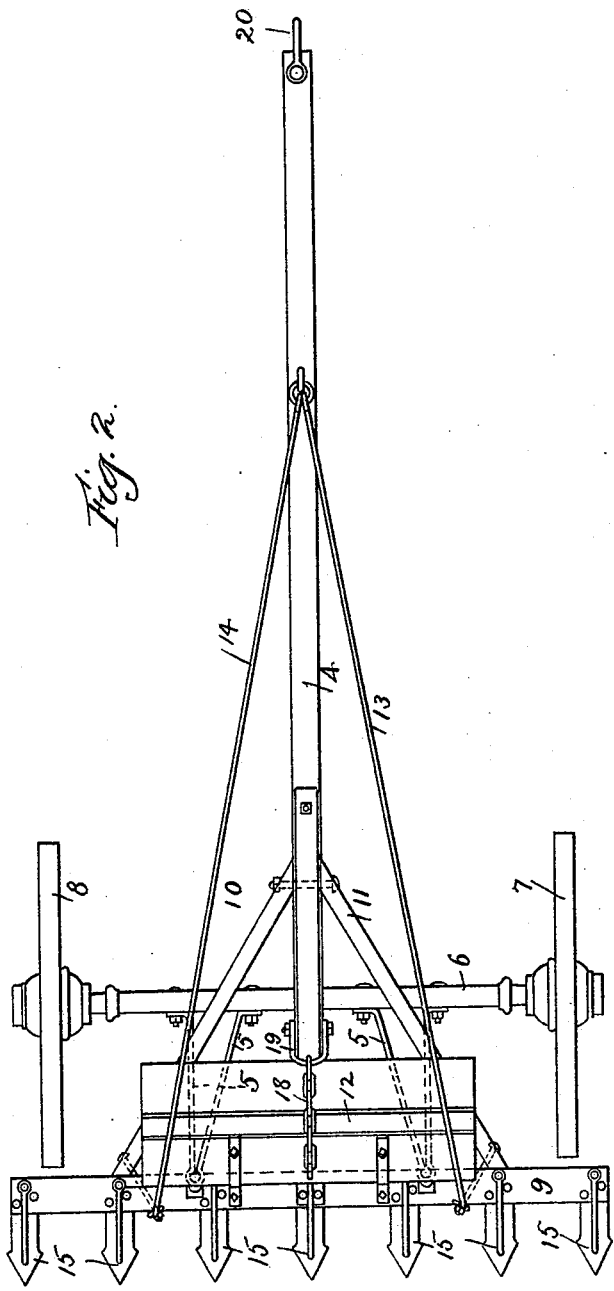

(No Model.)  2 Sheets—Sheet 2.
C. G. BILLINGS.
STUMP OR GRUB EXTRACTOR.
No. 583,450. Patented June 1, 1897.
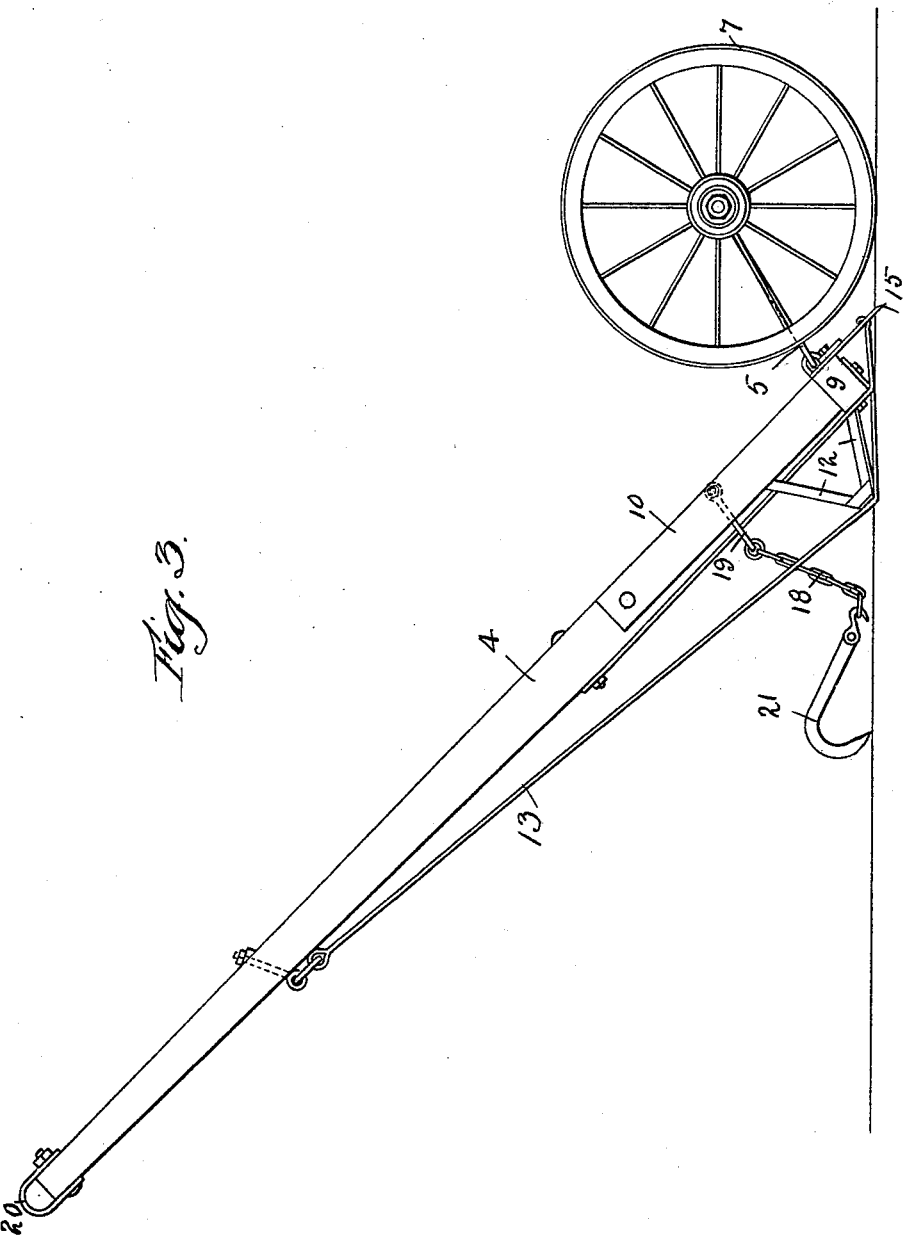

UNITED STATES PATENT OFFICE.

CHARLES G. BILLINGS, OF DOWNSVILLE, WISCONSIN.

STUMP OR GRUB EXTRACTOR.

SPECIFICATION forming part of Letters Patent No. 583,450, dated June 1, 1897.

Application filed March 6, 1896. Serial No. 582,154. (No model.)

*To all whom it may concern:*

Be it known that I, CHARLES G. BILLINGS, a citizen of the United States, residing at Downsville, in the county of Dunn and State of Wisconsin, have invented certain new and useful Improvements in Stump and Grub Extractors, of which the following is a specification, reference being had to the accompanying drawings, in which—

Figure 1 is a side elevation. Fig. 2 is a plan view, and Fig. 3 is a side elevation showing one position of the machine when in use.

My invention relates to stump-extractors, and has for its object to provide a new and improved machine for such work in which great leverage will be obtained, in which the extracting-lever will be so arranged as to be readily connected to the stump to be extracted, which will be provided with suitable mechanism to prevent slipping of the machine when in use, and which will contain certain other improvements, as will be hereinafter more specifically pointed out. I accomplish this object as hereinafter specified and as illustrated in the drawings. That which I regard as new will be set forth in the claims.

In the drawings, 4 indicates the operating-lever, which is of size suitable for the work for which it is intended. A cross-beam 9, attached to the lever 4, is connected by connecting-rods 5 to an axle 6, mounted upon wheels 7 8, as shown in Figs. 2 and 3. The arrangement is such that the operating-lever 4 may be thrown over away from the truck formed by the wheels and axle when it is to be attached to a stump, and may be thrown back to a more or less horizontal position and will then rest upon said truck after extracting the stump, as shown in Fig. 1, the object being to provide not only for elevating the lever, but for its transportation with or without the stump. At the rear end of the lever 4 is provided a cross-beam 9, which is braced to the lever by braces 10 11, as shown in Fig. 2.

12 indicates a bridge placed transversely at the rear end of the lever 4 on the upper side thereof, as best shown in Figs. 1 and 2.

13 14 indicate tie-rods connected at their forward ends to the lever 4 and extending rearward over the bridge 12 to the cross-beam 9, to which they are connected, thereby serving to brace the parts of the machine.

15 indicates a series of anchor-teeth secured to the under side of the cross-beam 9, as best shown in Figs. 1 and 2, a plate 16 being provided under said teeth for more fixedly securing them to said cross-beam. The teeth 15 are adapted to enter the ground when the extracting-lever is used, to prevent its slipping. Said teeth are braced by a series of brace-rods 17, which are connected to the teeth and to the upper side of the beam 9, as shown in Fig. 1.

18 indicates a chain which is connected by a yoke 19 to the elevating-lever 4, as shown in Fig. 1.

20 indicates a clevis at the forward end of the extracting-lever. 21 indicates a hook or other suitable device which is connected to the chain 18 and forms a means of connecting said chain to the stump to be extracted.

The operation of the machine is as follows: The extractor is brought up opposite the stump to be extracted and the lever 4 is then raised, being thrown over to the position shown in Fig. 3, the bridge resting upon the ground and the anchor-teeth entering the ground, as shown. At this time the lever will be thrown away from the truck which carries it, such action being permitted by the connecting-rods 5. The lever is then connected to the stump by the hook 21 and chain 18 or other suitable means, and the lever is then thrown back over the truck by means of a team or other suitable source of power connected to said lever by a rope or chain attached to the clevis 20. During this operation the anchor-teeth 15 will prevent the lever from slipping, and the bridge 12 forms a purchase for the chain to extract the grub, the chain which serves to attach the lever to the grub passing over said bridge, as shown. When the lever has been thrown over sufficiently to extract the grub, it will strike the axle 6, when the device is automatically remounted on the carriage. The arrangement of the lever secures great power, as the arm to which the power is applied may be made very much longer than the other, the purchase for the chain being formed by the bridge 12, over which the chain passes.

The most important features of my invention as above described are, first, that the machine is self-anchoring—that is, when the operating-lever is thrown over for the purpose of connection to a stump or grub the anchor-teeth enter the ground, and consequently the machine is automatically anchored in position—and this feature, so far as I am aware, is entirely novel; second, the operating-lever may be thrown away from the carriage and is automatically remounted thereon after the grub has been extracted; third, in providing the lever with a bridge which acts as a purchase for the attaching devices by which the lever is connected to the grub and the grub extracted. The arrangement of braces 14, which pass over the bridge and are connected to the cross-beam 9, is also an important feature, as the machine is greatly strengthened thereby.

I do not wish to be limited to the specific details shown, as various modifications may be made without departing from the spirit of my invention.

That which I claim as my invention, and desire to secure by Letters Patent, is—

1. In a stump-extractor, the combination with an operating-lever, of a bridge carried by said lever, devices extending over said bridge for attaching the lever to a stump, said bridge forming a purchase for said attaching devices, and means connected with said lever for preventing the lever from slipping, substantially as described.

2. In a stump-extractor, the combination with an operating-lever, of a bridge carried by said lever, devices extending over said bridge for attaching said lever to a stump, said bridge forming a purchase for said attaching devices, a cross-beam, and a series of teeth carried thereby, substantially as described.

3. In a stump-extractor, the combination with a truck, of an operating-lever, a bridge carried by said lever, devices extending over said bridge for attaching the lever to a stump, said bridge forming a purchase for said attaching devices, means connected with said lever for preventing the lever from slipping, and link connections between said truck and lever whereby the lever may be moved away from the truck, substantially as described.

4. In a stump-extractor, the combination with a truck, of an operating-lever, a bridge carried by said lever, devices extending over said bridge for attaching said lever to a stump, said bridge forming a purchase for said attaching devices, a cross-beam, a series of teeth carried thereby, and links connecting said cross-beam and truck, whereby said lever may be moved away from the truck, substantially as described.

5. In a stump-extractor, the combination with an operating-lever, of a bridge carried by said lever, devices extending over said bridge for attaching the lever to a stump, said bridge forming a purchase for said attaching devices, a cross-beam, a series of teeth carried thereby, and a plurality of brace-rods, one for each tooth, attached at their opposite ends respectively to the teeth and said cross-beam, substantially as described.

6. In a stump-extractor, the combination with an operating-lever, of a bridge carried by said lever, devices extending over said bridge for attaching the lever to a stump, said bridge forming a purchase for said attaching devices, a cross-beam, a series of teeth attached to said cross-beam, a plate 16 attached to the cross-beam beneath the teeth, and a plurality of brace-rods, one for each tooth, attached at their opposite ends respectively to the teeth and said cross-beam, substantially as described.

7. In a stump-extractor, the combination with a truck, of an operating-lever, a bridge carried by said lever, devices extending over said bridge for attaching the lever to a stump, said bridge forming a purchase for said attaching devices, and tie-rods connected at their forward ends to the lever and extending rearward over the bridge and attached to a cross-beam fixed to the rear end of the lever, substantially as described.

8. In a stump-extractor, the combination with a truck, of an operating-lever, a bridge carried by said lever, a device extending over said bridge for attaching said lever to a stump, said bridge forming a purchase for said attaching device, and a link connecting said lever with the truck-axle, whereby said lever may be thrown over away from said truck or may be swung back and remounted thereupon, substantially as described.

CHARLES G. BILLINGS.

Witnesses:
ED. ROSSETER,
E. H. CASSIDY.